(12) United States Patent
Donley et al.

(10) Patent No.: US 10,993,029 B2
(45) Date of Patent: Apr. 27, 2021

(54) MITIGATING CROSSTALK IN TISSUE CONDUCTION AUDIO SYSTEMS

(71) Applicant: Facebook Technologies, LLC, Menlo Park, CA (US)

(72) Inventors: Jacob Ryan Donley, Kirkland, WA (US); Morteza Khaleghimeybodi, Bothell, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 16 days.

(21) Appl. No.: 16/509,023

(22) Filed: Jul. 11, 2019

(65) Prior Publication Data

US 2021/0014614 A1    Jan. 14, 2021

(51) Int. Cl.
| | |
|---|---|
| *H04R 25/00* | (2006.01) |
| *H04R 3/14* | (2006.01) |
| *H04R 1/40* | (2006.01) |
| *H04R 1/10* | (2006.01) |

(52) U.S. Cl.
CPC .............. *H04R 3/14* (2013.01); *H04R 1/1008* (2013.01); *H04R 1/1091* (2013.01); *H04R 1/403* (2013.01); *H04R 2460/13* (2013.01)

(58) Field of Classification Search
CPC .............. H04R 2460/13; H04R 25/353; H04R 2217/03
See application file for complete search history.

(56) References Cited

U.S. PATENT DOCUMENTS

| | | | | |
|---|---|---|---|---|
| 6,668,061 | B1 * | 12/2003 | Abel | H04S 1/002 |
| | | | | 381/1 |
| 9,301,059 | B2 * | 3/2016 | Hamacher | H04R 25/453 |
| 9,547,175 | B2 * | 1/2017 | Farzbod | H04R 3/12 |
| 9,589,559 | B2 * | 3/2017 | Zhong | H04R 1/10 |
| 10,070,224 | B1 * | 9/2018 | Miller | H04S 7/304 |
| 10,231,053 | B1 | 3/2019 | Mehra et al. | |
| 10,356,231 | B2 | 7/2019 | Hosoi et al. | |
| 10,419,843 | B1 * | 9/2019 | Mehra | H04R 5/033 |
| 2013/0156202 | A1 | 6/2013 | Hamacher | |

OTHER PUBLICATIONS

PCT International Search Report and Written Opinion, PCT Application No. PCT/US2020/041038, dated Sep. 25, 2020, 11 pages.

* cited by examiner

*Primary Examiner* — Fan S Tsang
*Assistant Examiner* — Ryan Robinson
(74) *Attorney, Agent, or Firm* — Fenwick & West LLP

(57) ABSTRACT

An audio system on a headset presents audio content via tissue conduction to an inner ear of a first ear of a user. The system monitors, via one or more sensors on the headset, data about the presented audio content. The one or more sensors including at least one sensor configured to capture data about the presented audio content at a second ear of the user. The system estimates array transfer functions (ATFs) associated with the data, and generates sound filters for the transducer array using the estimated ATFs. The system presents adjusted audio content based in part on the sound filters. The adjusted audio content has a damped region at the second ear such that the amplitude of the adjusted audio content at the first ear has a higher amplitude than at the second ear.

17 Claims, 7 Drawing Sheets

MITIGATING CROSSTALK IN TISSUE CONDUCTION AUDIO SYSTEMS

BACKGROUND

The present disclosure generally relates to tissue conduction audio systems, and specifically relates to the mitigation of crosstalk in tissue conduction audio systems.

Head mounted displays (HMDs) may be used to present virtual and/or augmented information to a user. For example, an augmented reality (AR) headset or a virtual reality (VR) headset can be used to simulate an augmented/virtual reality. Conventionally, a user of the AR/VR headset wears headphones to receive, or otherwise experience, computer generated sounds, video, and haptic. However, wearing headphones suppresses sound from the real-world environment, which may expose the user to unexpected danger and also unintentionally isolate the user from the environment. Moreover, headphones separated from the outer casing or a strap of the HMD may be aesthetically unappealing and may be damaged through use.

SUMMARY

A method for mitigating crosstalk in a tissue conduction audio system. The method presents, via a transducer array of a headset, audio content via tissue conduction (e.g., bone conduction and/or cartilage conduction) to a first ear of a user. A sensor array of the headset monitors data, at both the first and second ears of the user, about the presented audio content. Array transfer functions (ATFs) associated with the audio content are estimated based on the sensor data. Sound filters are generated using the estimated ATFs. The sound filters are applied to transducer signals from the transducer array, which present adjusted audio content to the user's ears. The amplitude of the adjusted audio content at the first ear is higher than the amplitude of the adjusted audio content at a damped region at the second ear. In some embodiments, the amplitude of the adjusted audio content at the second ear is higher than the amplitude of the adjusted audio content at a damped region at the first ear. In some embodiments, a transitory computer readable medium is configured to store program code instructions. The code instructions, when executed by a processor, cause the processor to perform steps of the method.

In some embodiments, an audio system is part of a headset (e.g., near eye display, head mounted display). The audio system includes a transducer array, one or more sensors, and a controller. The transducer array is configured to present audio content via tissue conduction to an inner ear of a first ear of a user. The one or more sensors on the headset are configured to monitor data about the presented audio content, the one or more sensors including at least one sensor configured to capture data about the presented audio content at a second ear. The controller is configured to estimate array transfer functions (ATFs) associated with the data, and generate sound filters for the transducer array using the estimated ATFs. The controller instructs the transducer array to present adjusted audio content, based in part on the sound filters, wherein the adjusted audio content has a damped region at the second ear such that the amplitude of the audio content at the first ear has a higher amplitude than at the second ear.

Figure 1:
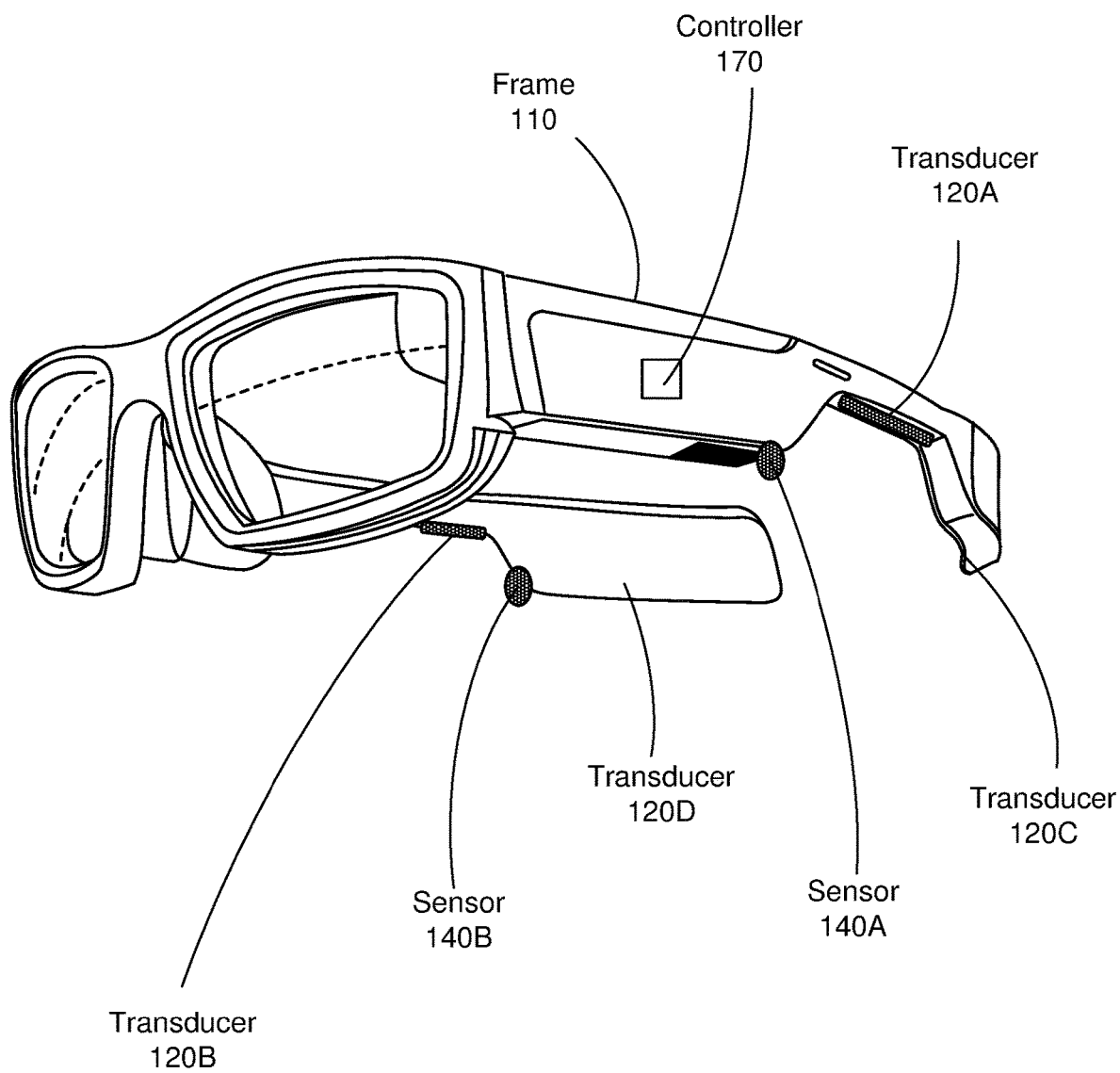
FIG. 1 is a diagram of a headset, in accordance with one or more embodiments.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

A tissue conduction audio system presents audio content to a user using one or both of bone conduction and cartilage conduction. Tissue conduction delivers audio content to the user using cartilage conduction and/or bone conduction. Tissue conduction may occur via bone conduction and/or cartilage conduction, that vibrates bone and/or cartilage to generate acoustic pressure waves.

A bone conduction audio system uses bone conduction for providing audio content to the ear of a user while keeping the ear canal of the user unobstructed. The bone conduction audio system includes a transducer assembly that generates tissue born acoustic pressure waves corresponding to the audio content by vibrating tissue in a user's head that includes bone, such as the mastoid. Tissue may include e.g., bone, cartilage, muscle, skin, etc. For bone conduction, the primary pathway for the generated acoustic pressure waves is through the bone of the head (bypassing the eardrum) directly to the cochlea. In bone conduction, the acoustic pressure waves may just travel through bone to reach the cochlea, bypassing air conduction pathways. The cochlea turns tissue borne acoustic pressure waves into signals which the brain perceives as sound.

A cartilage conduction audio system uses cartilage conduction for providing audio content to an ear of a user. The cartilage conduction audio system includes a transducer assembly that is coupled to one or more portions of the auricular cartilage around the outer ear (e.g., the pinna, the tragus, some other portion of the auricular cartilage, or some combination thereof). The transducer assembly generates airborne acoustic pressure waves corresponding to the audio content by vibrating the one or more portions of the auricular cartilage. This airborne acoustic pressure wave may propagate toward an entrance of the ear canal where it would be detected by the ear drum. However, the cartilage conduction audio system is a multipath system that generates acoustic pressure waves in different ways. For example, vibrating the one or more portions of auricular cartilage may generate: airborne acoustic pressure waves that travel through the ear canal; tissue born acoustic pressure waves that cause some portions of the ear canal to vibrate thereby generating an airborne acoustic pressure wave within the ear canal; or some combination thereof.

Note that the tissue conduction system is different from airborne audio systems (e.g., a conventional speaker) for at least the reason that the tissue conduction system can generate airborne acoustic waves by vibrating tissue (bone, cartilage, etc.) of the user. The vibration of the tissue creates several acoustic pathways, such that the acoustic pressure waves may travel through tissue, bone, air, or a combination thereof. In contrast, a typical airborne audio system uses speakers with vibrating membranes that directly displace air to generate airborne acoustic waves.

The audio system may be part of a headset (e.g., near eye display or a head mounted display). The audio system includes a transducer array, sensors, and a controller. The transducer array presents audio content via tissue conduction to a headset user's inner ear. The sensors capture data about the initially presented audio content at both ears of the headset user. The controller estimates array transfer functions (ATFs) associated with the audio content presented at each ear, and generates sound filters using the estimated ATFs. ATFs comprise a collection of transfer functions that characterize how audio content produced by the transducer array is received by the sensor array. A transfer function defines a relationship between sound produced at its source location, i.e., a transducer, and where it is detected, i.e., a sensor. Parameters that help define the relationship may include frequency, amplitude, time, phase, duration, and a direction of arrival (DoA) estimation, among others. In some embodiments, Eigen value decomposition is used to determine a transfer function. In other embodiments, singular-value decomposition is used to determine the transfer function. The transducer array presents audio content to both ears, adjusted in part by the generated sound filters, such that crosstalk caused by tissue conduction is mitigated. The controller designates a first ear as a "bright zone," and a second ear as a damped, "quiet zone." The adjusted audio content has a lower amplitude at the quiet zone than at the bright zone, and in some cases, there may be a null in the sound field at the quiet zone, where no audio content is perceivable.

Presenting audio content via tissue conduction transducers may result in crosstalk due to, e.g., sharing of the user's cranial bone as a common medium for transmitting the vibrations. By dampening sound at regions that crosstalk may be perceived, the audio system described herein mitigates at least some of the crosstalk that results from tissue conduction.

Embodiments of the invention may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

System Overview

FIG. 1 is a diagram of a headset 100, in accordance with one or more embodiments. The headset 100 presents media to a user. The headset 100 includes an audio system and a frame 110. In general, the headset may be worn on the face of a user such that content is presented using the headset. Content may include audio and visual media content that is presented via the audio system and a display, respectively. In some embodiments, the headset may only present audio content via the headset to the user. The frame 110 enables the headset 100 to be worn on the user's face and houses the components of the audio system. In one embodiment, the headset 100 may be a head mounted display (HMD).

The audio system presents audio content to the user of the headset. The audio system is a tissue conduction system. The audio system includes, among other components, a transducer array, a sensor array, and a controller 170. The audio system may provide audio content via tissue conduction, also generating some level of crosstalk as a byproduct of its operation. For example, sound emitted to a first inner ear of the user may also be received by the user's other inner ear, due to vibrations to tissue near the first ear transmitting through the user's cranial bone to the user's other inner ear. In some embodiments, the acoustic waves may be transmitted through tissue other than the cranial bone. Additional details regarding the audio system are discussed below with regard to FIGS. 2-6.

The transducer array generates audio content (i.e., acoustic pressure waves) in accordance with vibration instructions from the controller 170. In some embodiments, the audio content may include a reference audio signal. For example, the reference audio signal may be content from the user, such as music, a speech, or other user preferred content. In other embodiments, the reference audio signal may cover a large frequency range, such as a maximum length sequence, a pseudo random pink noise, a pseudo random white noise, a linear sinusoidal sweep, a logarithmic sinusoidal sweep, or some combination thereof. The transducer array also presents filtered audio content to the user, after the audio content has been adjusted as per the controller's instructions. The transducer array is further described with respect to FIGS. 3A-B.

The transducer array directly vibrates tissue (e.g., bone, skin, cartilage, etc.) to generate an acoustic pressure wave. The transducer assembly may include one or more transducers. A transducer (also referred to as a tissue conduction transducer) may be configured to function as a bone conduction transducer or a cartilage conduction transducer. In some embodiments, each transducer array may include one or more transducers to cover different parts of a frequency range. For example, a piezoelectric transducer may be used to cover a first part of a frequency range and a moving coil transducer may be used to cover a second part of a frequency range. In some embodiments, the transducer array may include transducers that serve as medical implants, such as cochlear implants.

The bone conduction transducers generate acoustic pressure waves by vibrating bone/tissue in the user's head. A bone conduction transducer is coupled to an end piece of the frame 110 and may be configured to be behind the auricle coupled to a portion of the user's skull. The bone conduction transducer receives vibration instructions from the controller 170, and vibrates a portion of the user's skull based on the received instructions. The vibrations from the bone conduction transducer generate a tissue-borne acoustic pressure wave that propagates toward the user's cochlea, bypassing the eardrum.

The cartilage conduction transducers generate acoustic pressure waves by vibrating one or more portions of the auricular cartilage of the ears of the user. A cartilage conduction transducer is coupled to a temple arm of the frame 110 and may be configured to be coupled to one or more portions of the auricular cartilage of the ear. For example, the cartilage conduction transducer may couple to the back of an auricle of the ear of the user. The cartilage conduction transducer may be located anywhere along the auricular cartilage around the outer ear (e.g., the pinna, the tragus, some other portion of the auricular cartilage, or some combination thereof). Vibrating the one or more portions of auricular cartilage may generate: airborne acoustic pressure waves outside the ear canal; tissue born acoustic pressure waves that cause some portions of the ear canal to vibrate thereby generating an airborne acoustic pressure wave within the ear canal; or some combination thereof. The generated airborne acoustic pressure waves propagate down the ear canal toward the ear drum.

The sensor array monitors the audio content emitted by the transducer array. The sensor array includes a plurality of sensors. In the illustrated embodiments, the sensor array includes a sensor 140A and a sensor 140B. The sensors 140A, 140B may be, for example, a microphone, an accelerometer, other acoustic sensor, or some combination thereof. The sensor array monitors audio content provided by the transducer array using data from the sensors 140A, 140B. The sensor array generates sensor data based on the monitored audio content. Note that the monitored audio content may have propagated through a head of the user prior to being captured by a sensor. For example, audio content provided by the transducer 120A may be detected at the sensor 140B.

In some embodiments, the transducers 120A-D and sensors 140A-B may be positioned in different locations within and/or on the frame 110 than presented in FIG. 1. For example, in some embodiments, the sensors 140A-B may be microphones configured to fit within an ear of the user. The headset may include transducers and/or sensors varying in number and/or type than what is shown in FIG. 1.

The controller 170 controls the tissue conduction system. The controller 170 may receive audio data (e.g., music) from local memory or some external entity (e.g., a console, remote server, etc.) for presentation to the user. The controller 170 generates vibration instructions based on the received audio data, and provides the vibration instructions to the transducer array. In some embodiments, the vibration instructions are such that the transducer array generates a reference audio signal.

The controller 170 generates ATFs using sensor data from the sensor array. The ATFs, as described above, comprise a number of transfer functions (e.g., a transfer function for each sensor) that characterize the way audio content (e.g., the audio reference signal) is received by the sensor array. The controller 170 uses the ATFs to generate sound filters. The sound filters that are applied to the audio data to adjust the audio content presented by the transducer array. As described in greater detail below with regard to FIG. 3A-6 the adjusted audio content mitigates crosstalk in the audio content presented by the transducer array. Operation of the controller 170 is described in detail below, with regard to FIGS. 3A, 3B. and 4.

Figure 2:
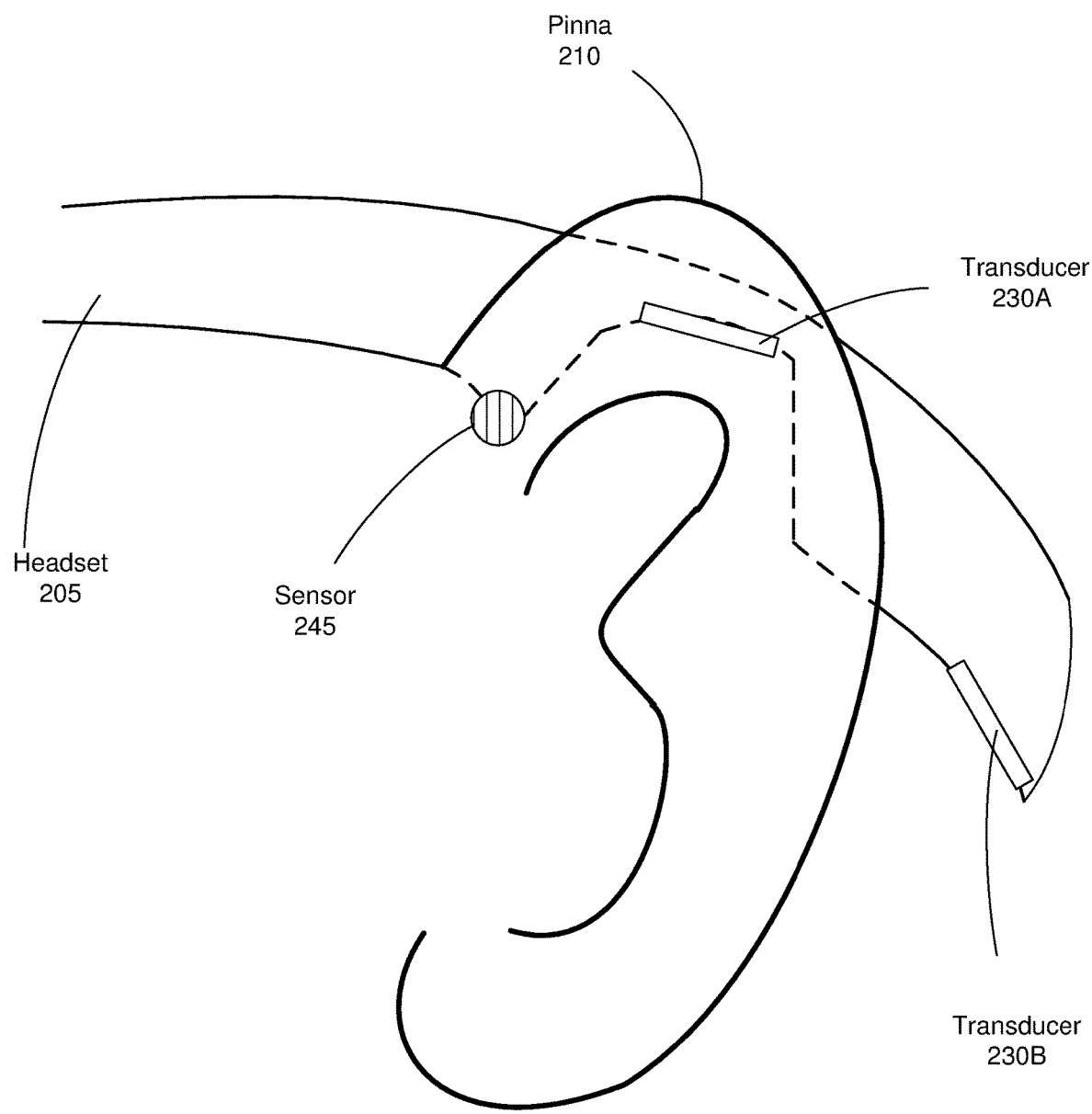
FIG. 2 is a side view of a portion of a headset, in accordance with one or more embodiments.

FIG. 2 is a side view 200 of a portion of a headset 205, in accordance with one or more embodiments. The headset 205 is an embodiment of the headset 100. The headset 205 presents audio content to the user, by a tissue conducting audio system. The headset 205 rests in part on the user's ears, such that it may be in proximity to a pinna 210 of an ear of the user. The headset 205 includes, among other components, a transducer array and a sensor array. The transducer array includes a group of transducers 230A, 230B, and the sensor array comprises a group of sensors including a sensor 245. The transducers 230A, 230B are embodiments of transducers 120A, 120C, and sensor 245 is an embodiment of sensor 140A.

The transducers 230A, 230B provide audio content for one or both ears of the user. The transducers 230A, 230B are proximate to and/or coupled to various tissue on or near the ear of the user. Coupling may be such that there is indirect and/or direct contact between some or all of the transducers 230A, 230B and the tissue of the user. For example, the transducer 230A may be a cartilage conduction transducer that couples to a back of the pinna or top of the pinna 210 of an ear of the user. The transducer 230B may be a bone conduction transducer that couples to a portion of a bone near the ear. The transducers 230A, 230B vibrate the tissue they are coupled to, generating a range of acoustic pressure waves, detected as sound by a cochlea of the user's inner ear (not shown in FIG. 2).

In some embodiments, the headset 205 may include a combination of one or more bone conduction and cartilage conduction transducers. In some embodiments, the headset 205 may include one or more air conduction transducers (not shown) and provide audio content to the user by a combination of air conduction and tissue conduction.

The sensor 245 monitors the audio content presented by the transducer array. The sensor 245 is an embodiment of sensor 140A. The sensor 245 is positioned on the headset to detect the acoustic pressure waves produced by the conduction transducers 230A-B and/or other tissue conduction transducers (e.g., those located near the user's other ear). In some embodiments, the sensor 245 may be positioned within the ear canal. The sensor 245 may be part of a sensor array positioned on or near the headset, wherein the sensor array includes a plurality of sensors. The sensor array may include a plurality of acoustic sensors similar to sensor 245, in addition to sensors designated for use other than measuring audio data. Other sensors the sensor array may include inertial measurement units (IMUs), gyroscopes, position sensors, accelerometer, or a combination thereof. At the other ear of the user, the audio system includes another group of transducers and at least another sensor, included in the headset's transducer array and sensor array, respectively.

Crosstalk Mitigation

Figure 3A:
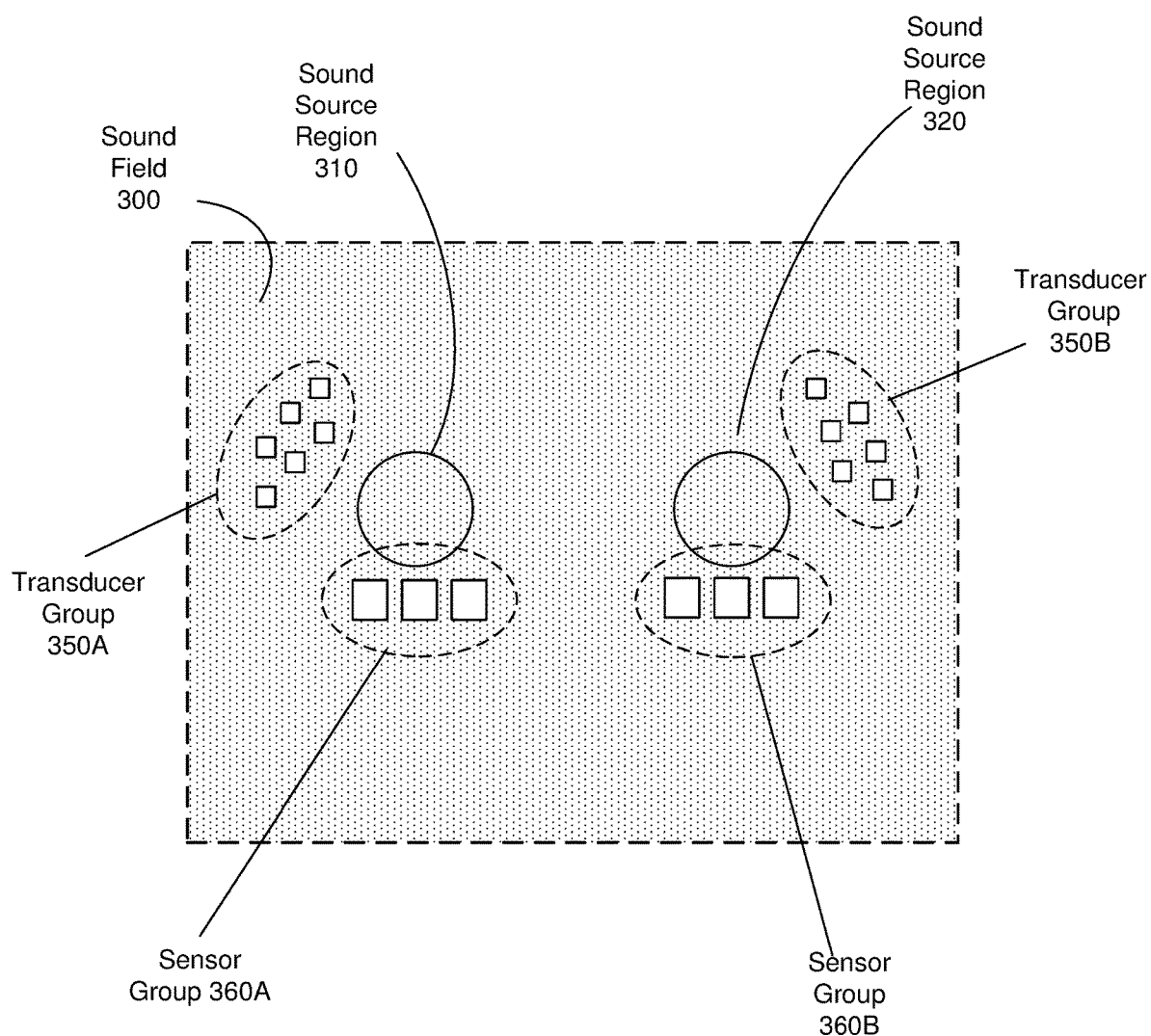
FIG. 3A illustrates a sound field prior to crosstalk mitigation, in accordance with one or more embodiments.

FIG. 3A illustrates a sound field 300 prior to crosstalk mitigation, in accordance with one or more embodiments. An audio system provides audio content to a user of the headset by generating the sound field 300. The audio system may be part of a headset (e.g., the headset 100). The sound field 300 includes at least sound source regions 310 and 320, transducer groups 350A and 350B, and sensor groups 360A and 360B. The transducer groups 350A and 350B are part of a transducer array, while the sensor groups are part of a sensor array, as described in further detail with respect to FIG. 4.

The sound field 300 is a region in which audio content from one or both of the transducer groups 350A, 350B propagates. Note that while the sound field 300 is shown as having a rectangular geometry for simplicity. In actuality, it would correspond to a head of the user. The sound source regions 310 and 320 are regions within the sound field 310 that would include, e.g., an inner ear, an ear drum, an ear canal of the user, or some combination thereof. For example, the sound source region 310 may correspond to an inner ear for a right ear of a user, and the sound source region 320 may correspond to an inner ear for a left ear of the user.

The transducer groups 350A, 350B generate the sound field 300 and thereby provide audio content to the sound source regions 310 and 320, respectively. The transducer groups 350A, 350B may comprise a number of transducers, such as transducers 230A, 230B shown in FIG. 2. The transducer array includes a collection of the transducer groups 350A, 350B. In the illustrated embodiment, the sound field 300 is meant to be presented to the sound source region 310, but not the sound source region 320. Note that because the sound field 300 is within a head of the user, presenting audio content via tissue conduction transducers may result in crosstalk due to, e.g., sharing of the user's cranial bone as a common medium for transmitting the vibrations. Accordingly, it can be difficult to selectively target audio content to a single sound source region (e.g., to sound source region 310, but not to the sound source region 320, or vice versa). As shown in FIG. 3A, for example, if the transducer group 350A produced audio content in a sound field 300 at the sound source region 310, the sound field 300 reaches the sound source region 320 as well, thereby resulting in crosstalk. And for simplicity the crosstalk is shown as the sound field 300 overlapping with the sound source region 320.

The sensor array monitors audio content in the sound field 300. The sensor array monitors audio content produced by the transducer group 350A and/or the transducer group 350B via the sensor groups 360A, 360B. The sensor groups 360A, 360B coincide with the sound source region 310 and 320, respectively, such that each sound source region is monitored by a designated sensor group. The sensor groups 360A, 360B each comprise one or more sensors, such as sensor 245 as shown in FIG. 2. The sensor groups 360A is configured to monitor audio content at the sound source region 310 and the sensor group 360B is configured to monitor audio content at the sound source region 320.

In some embodiments, a transducer group is positioned on and/or near a first ear of the user, with another transducer group positioned on and/or near the second ear of the user. Similarly, a sensor group is positioned in proximity to the first ear, with another sensor group positioned in proximity to the second ear.

A controller (not shown) of the audio system processes the sound data captured by the sensor groups 360A, 360B, to generate sound filters. The sound filters are used to present adjusted audio content, via the transducer array that acts to mitigate crosstalk. This is further described with respect to FIGS. 3B and 4 below.

Figure 3B:
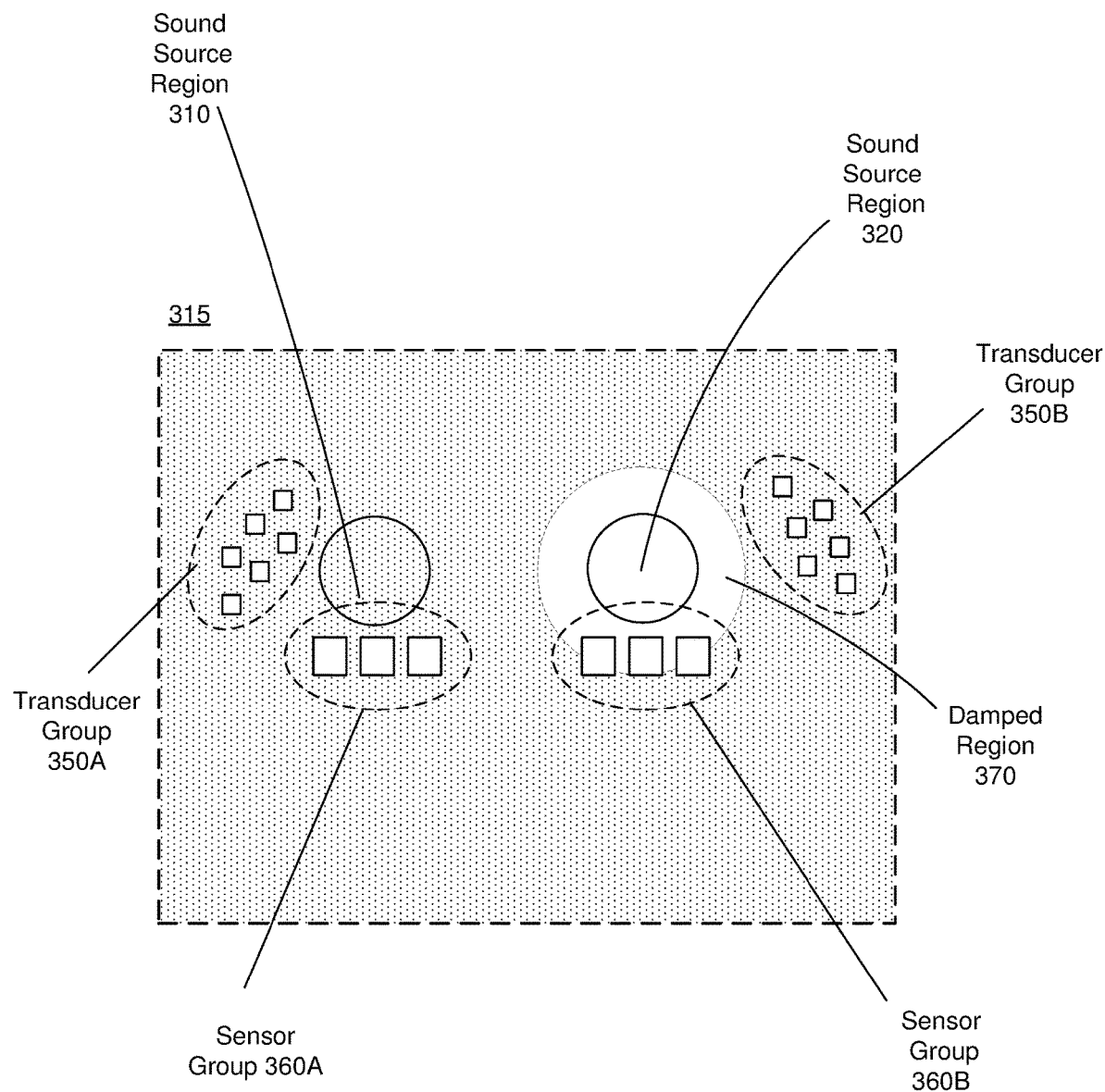
FIG. 3B illustrates a sound field after crosstalk mitigation, in accordance with one or more embodiments.

FIG. 3B illustrates a sound field 315 after crosstalk mitigation, in accordance with one or more embodiments. The sound field 315 is generated by the audio system. The sound field 315 is substantially similar to the sound field 300 described in FIG. 3A, but modified to include a damped region 370. The damped region 370 helps mitigate at least some of the crosstalk produced by the transducers in the transducer groups 350A, 350B.

The transducer group 350A and/or the transducer group 350B produce adjusted audio content around in accordance with instructions from the controller (not shown). In the illustrated embodiment, the adjusted audio content is such that a damped region 370 is formed in the sound field 315. As described with respect to FIG. 3A, the sound field 300 may reach the sound source region 320 due to crosstalk. By damping the sound perceived at the sound source region 320, i.e., an inner ear, the audio system can mitigate sound being perceived at the sound source region 320, thereby reducing crosstalk.

In the illustrated embodiment, the sound source region 320 is designated a "quiet zone." A quiet zone is a sound source region that is enclosed by a damped region. A damped region is a location in a sound field where the audio content is substantially reduced relative to portions of the sound field bordering the damped region. The damped region may be defined as having an acoustic amplitude below a threshold level from sound outside the damped region that is part of the sound field. In some embodiments, the gradient between the sound field bordering the damped region and the threshold level may drop off exponentially. The gradient may be tied to the wavelength or wavenumber of the specific sound field. The size of the damped regions may be determined based on the wavelength of the received sound, which is encoded in the ATF and used for the sound filters.

In some embodiments, the damped region may be a null. A null is a location in a sound field where an amplitude is essentially zero. Accordingly, as the sound source region 320 is within the damped region 320, the audio content perceived at the sound source region 320 is substantially reduced, and in some cases it is low enough such that it would not be perceivable by the left ear of the user.

In the illustrated embodiment, the sound source region 310 is designated a "bright zone." A bright zone is a sound source region of the sound field that is not within a damped region. Note in some embodiments, the bright zone also may include some amplification of the sound field. For example, the bright zone may be such that an amplitude of audio content is increased relative to portions of the sound field bordering the bright zone.

The controller estimates one or more ATFs that characterize the relationship between the sound played by the transducer array and the sound received by the sensor array using the data captured by the sensor array. The controller generates sound filters based on the estimated one or more ATFs. The sound filters adjust the audio output produced by the transducer array. For example, at the damped region 370, the sound filters may result in audio content with attenuated amplitudes. The process of estimating ATFs and generating sound filters is described in further detail with respect to FIG. 4. The controller instructs the transducer groups 350A, 350B to present filtered and thereby adjusted audio content at the sound source regions 310, 320.

At the quiet zone, the transducer group 350B presents filtered audio content to the sound source region 320. The user's inner ear near the damped region 370, i.e., sound source region 320, perceives sound with a lower amplitude than the sound produced at the bright zone, near the sound source region 310. Damping the audio content at the sound source region 320, where crosstalk was perceived in FIG. 3A, results in the mitigation of at least some of the crosstalk heard by the user. In some embodiments, some portion of the audio content may be produced at the sound source 320, for the inner ear at the sound source region 320 to perceive. The amount of dampening at the damped region 370 may account for the audio content to be produced at the sound source 320. For example, crosstalk perceived at that inner ear may be damped such that the audio content meant for the inner ear is perceivable.

Figure 4:
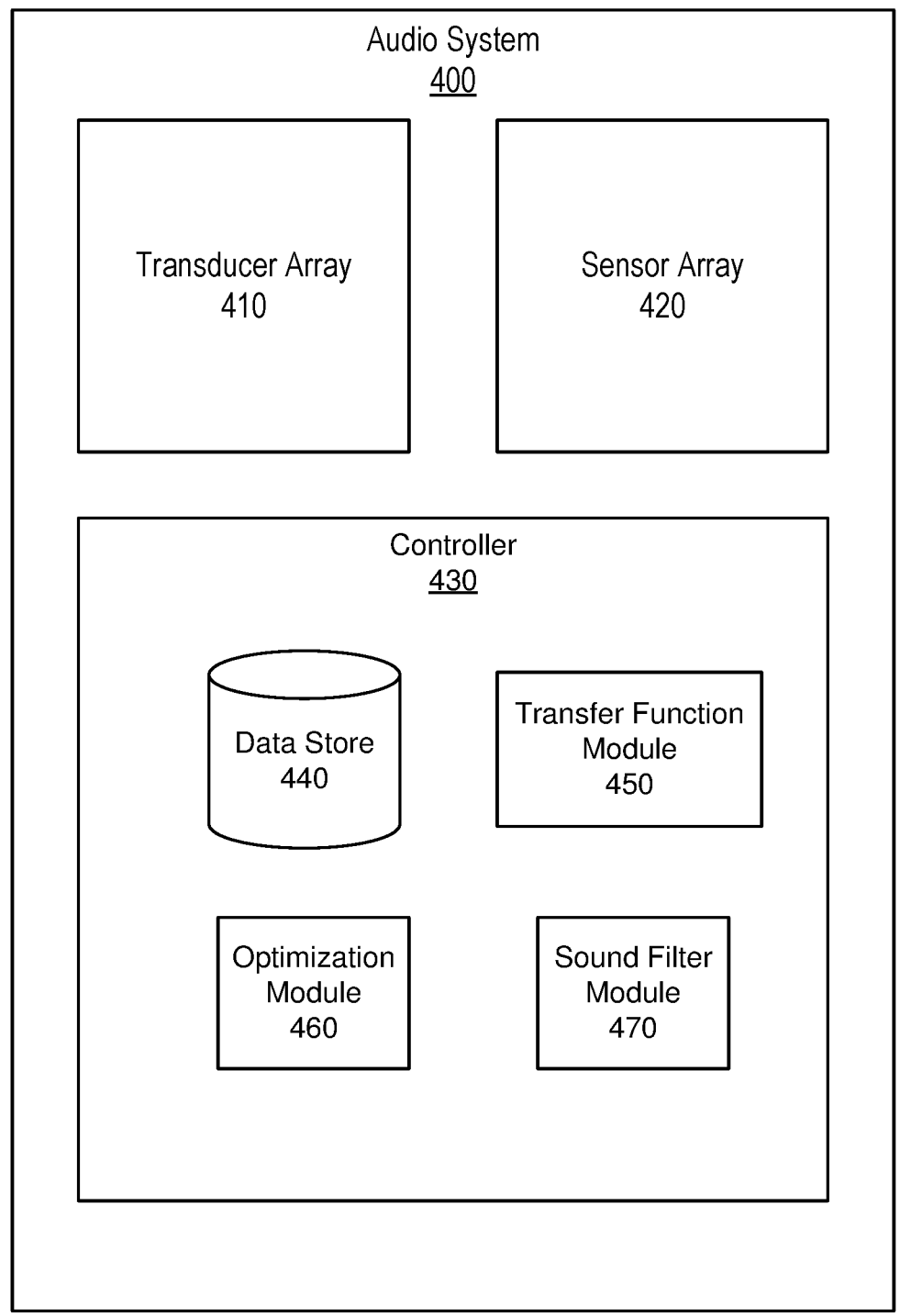
FIG. 4 is a block diagram of an example audio system, in accordance with one or more embodiments.

FIG. 4 is a block diagram of an example audio system 400, according to one or more embodiments. The audio system 400 may be a component of a headset (e.g., headset 100) that provides audio content to the user. The audio system 400 includes a transducer array 410, a sensor array 420, and a controller 430. The audio systems described in FIGS. 1-3B are embodiments of the audio system 400. Some embodiments of the audio system 400 include other components than those described herein. Similarly, the functions of the components may be distributed differently than described here. For example, in one embodiment, the controller 430 may be external to the headset, rather than embedded within the headset.

The transducer array 410 provides audio content to the user. The transducer array 410 may comprise a number of transducer groups (e.g., the transducer groups 350A, 350B). Each transducer group includes one or more transducers (e.g., transducers 120A, 120B, 120C, and 120D) that may be used to provide the audio content to the user. The transducers may be tissue conduction transducers, such as bone conduction transducers, cartilage conduction transducers, or some combination thereof. Note in some embodiments, the transducers may also include one or more air transducers (i.e., speakers). The transducer array 410 provides audio content to the user over a total range of frequencies. For example, the total range of frequencies is 20 Hz to 20 kHz, generally around the average range of human hearing. The transducers in the transducer array 410 are configured to vibrate over various ranges of frequencies. In one embodiment, each transducer in the transducer array 410 operates over the total range of frequencies. In another embodiment, one or more transducers operate over a low subrange (e.g., 20 Hz to 500 Hz), while a second set of transducers operates over a high subrange (e.g., 500 Hz to 20 kHz). In some embodiments, the various ranges of frequencies may partially overlap with.

The tissue conduction transducers in the transducer array 410 generate acoustic pressure waves in accordance with instructions received by the controller 430. The transducers are coupled to tissue near the user's ear, such as cartilage or bone, and vibrate the tissue to produce the sound waves. The acoustic pressure waves are detected by the ear drum and/or inner ear of the user, such as at the cochlea. In another embodiment, the transducers are coupled to the user's jaw or skull, rather than tissue near the ear. In some embodiments, the transducer array 410 may include air conduction transducers that vibrate to generate airborne acoustic pressure waves perceivable by the cochlea of the user's ear.

The sensor array 420 detects sound produced by the transducer array 410. The sensor array 420 may include one or more sensor groups (e.g., the sensor groups 360A, 360B). A sensor group includes one or more sensors (e.g., sensor 245). A sensor may be, e.g., a microphone, a vibration sensor, an accelerometer, or any combination thereof. In some embodiments, a sensor may be a component of a hearing aid or cochlear implant. The sensor array 420 is configured to monitor the audio content generated by the transducer array 410 using sensors in the one or more sensor groups. Increasing the number of sensors may improve the accuracy of information describing the sound field produced by the transducer array 410. Each sensor is configured to detect sound and convert the detected sound into an electronic format.

The controller 430 (e.g. controller 365) controls the operation of the audio system 400. In some embodiments, the controller 430 is configured to mitigate crosstalk produced by the audio system 400. The controller 430 includes a data store 440, a transfer function module 450, an optimization module 460, and a sound filter module 470. The controller 430 may be located inside the headset, in some embodiments. Some embodiments of the controller 430 have different components than those described here. Similarly, functions can be distributed among the components in different manners than described here. For example, some functions of the controller may be performed external to the headset.

The data store 440 stores data for use by the audio system 400. Data in the data store 440 may include sounds recorded in the local area of the headset, audio content, preset audio content such as reference signals, head-related transfer functions (HRTFs), transfer functions for one or more sensors and/or transducers, array transfer functions (ATFs) for sensors and/or transducers, optimization constraints, sound filters, model for a head of a user, and other data relevant for use by the audio system 400, or any combination thereof. The sounds recorded in the local area of the headset may include data collected by the sensor array 420. The data store 440, in some embodiments, includes data on which sound source regions (e.g., ears) the controller 430 designates as the bright zone and the quiet zone.

The transfer function module 450 estimates array transfer functions (ATFs) using data captured by a plurality of sensor groups in the sensor array 420. A sensor group includes one or more sensors. Each sensor group is configured to monitor a specific sound source region. For example, in one embodiment, there is a sensor group that monitors the audio content at a sound source region associated with the right ear and a second sensor group that monitors the audio content at a sound source region associated with the left ear.

As discussed above, the ATFs comprise a number of transfer functions that characterize the relationship between the sound produced by transducers in the transducer array 410 and the corresponding sound received by the sensors in the sensor array 420. A plurality of transfer functions for a set of transducers or sensors are referred to as an array transfer function. In some embodiments, Eigen-value decomposition is used to determine a transfer function. In some embodiments, singular-value decomposition is used to determine the transfer function. For a given transducer and/or sensor, a collection of transfer functions for all of the sensors in the sensor array is referred to as an ATF. An ATF characterizes how the sensor array 420 receives a sound from the transducer and characterizes how the transducer array 410 produces sound. An ATF also defines a relationship between parameters of the sound at the location of the transducer and the parameters at which the sensor array 420 detected the sound. In some embodiments, a Relative Transfer Function (RTF) is another type of ATF that is normalized by an arbitrary sensor on the sensor array 420. An RTF may be normalized by an arbitrary transducer on the transducer array 410.

The optimization module 460 produces one or more sound filters to be applied to transducers in the transducer array 410. The optimization module 460 takes in the ATFs estimated by the transfer function module 450 as input, and applies an optimization algorithm to the ATFs. The optimization algorithm may be subject to one or more constraints, stored in the data store 440, and outputs sound filters accordingly. Constraints may include, among others, designation of a left ear as a bright zone or a quiet zone, designation of a right ear as a bright zone or a quiet zone, a type of conduction (e.g., air, cartilage, and/or bone) by which the sound was transmitted to the user, or some combination thereof. Some constraints may relate to the user of the headset, such as head-related transfer functions, models of the user's head, photos of the user, constraints that depend on demographic information, or some combination thereof. Other constraints may include a direction of propagation of the reproduced waves through the user's tissue and/or bone, the shape of the sound field produced through the user's tissue and/or bone, or some combination thereof. The optimization algorithm may be linearly constrained, e.g., a linearly constrained minimum variance (LCMV) algorithm, an imperialist competitive algorithm, or an algorithm that uses principal component analysis. The optimization algorithm may be an algorithm not mentioned herein. The sound filters output by the optimization module 460 are input into the sound filter module 470. The sound filters may amplify or attenuate the acoustic pressure waves presented by one or more of the transducers, may target specific frequency ranges differently, or some combination thereof. Sound filters may include, among others, low pass filters, high pass filters, and bandpass filters.

In some embodiments, the optimization module 460 applies the optimization algorithm for a first ear being the bright zone, and the second ear as being the quiet zone, to generate a first set one or more sound filters. The optimization module 460 also applies the optimization algorithm for the second ear being the bright zone, and the first ear as being the quiet zone, to generate a second set of one or more sound filters. The above processes may be done in parallel or in series.

The sound filter module 470 provides the sound filters to the transducer array 410. The sound filters, as applied by transducer array 410, adjust the audio content such that there is a dampened region (e.g., may be a null) at the ear designated as the quiet zone, while providing audio content to the other ear designated as the bright zone. By dampening sound at regions that crosstalk may be perceived, the audio system 400 described herein mitigates at least some of the crosstalk that results from tissue conduction.

Figure 5:
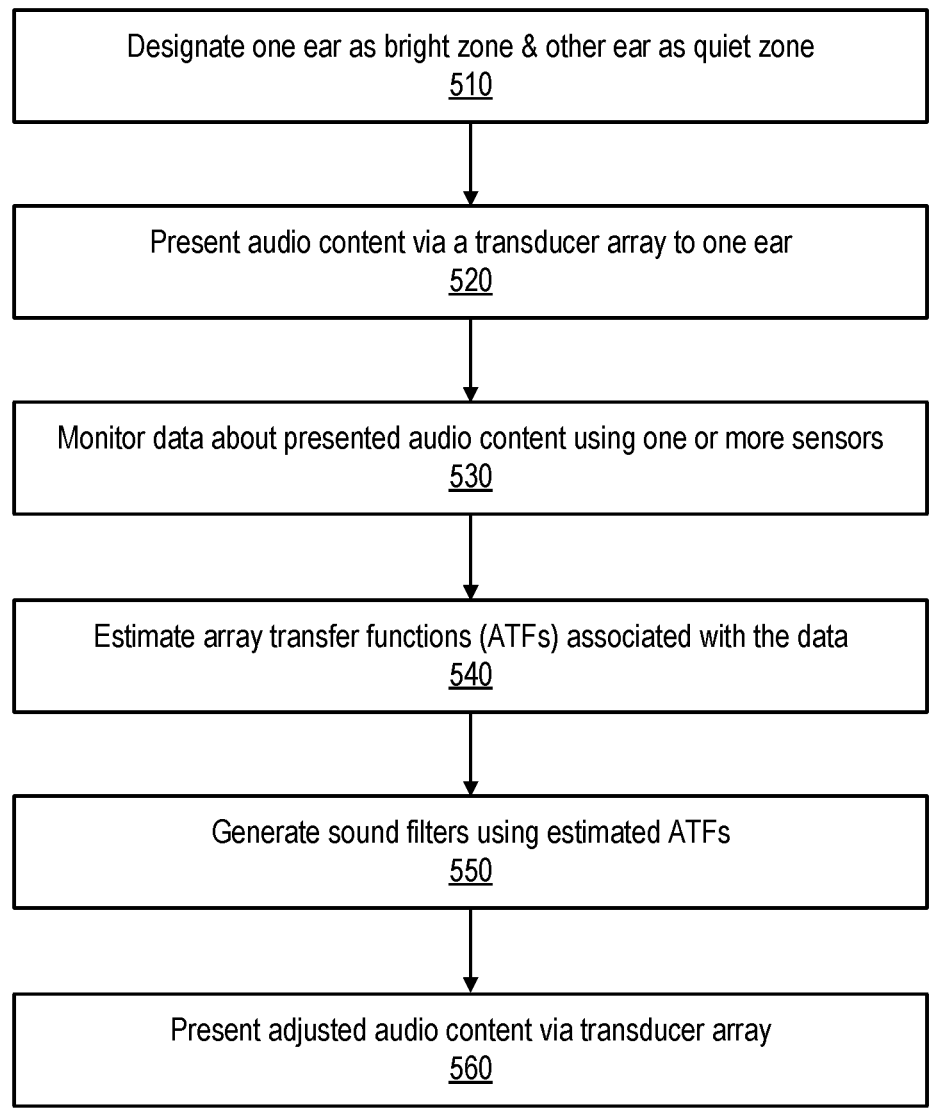
FIG. 5 is a process for mitigating crosstalk in a tissue conduction audio system, in accordance with one or more embodiments.

FIG. 5 is a process 500 for mitigating crosstalk in a tissue conduction audio system, according to one or more embodiments. The process shown in FIG. 5 may be performed by components of an audio system (e.g., audio system 400). Other entities may perform some or all of the steps in FIG. 5 in other embodiments. Embodiments may include different and/or additional steps, or perform the steps in different orders.

The audio system 400 designates 510 a first ear of a user wearing a headset (e.g., headset 100) as a bright zone, and a second ear of the user as a quiet zone.

The audio system 400 presents 520 audio content via a transducer array (e.g., transducer array 410) to the first ear of the user. The audio content may be, e.g., music, voice, etc. In some embodiments, the audio content may include a reference audio signal. The transducer array presents the audio content via tissue conduction to an inner ear of the ear of the user. As the audio content is presented via tissue conduction, some of the audio content may also be received at the second ear of the user (i.e., crosstalk).

The audio system 400 monitors 530 data about the presented audio content using one or more sensors. The one or more sensors may be part of a sensor array (e.g., the sensor array 420). The one or more sensors include at least one sensor configured to capture data about the presented audio content at the other ear of the user. The captured data includes data describing audio content intended for the first ear, but detected at the second ear (i.e., crosstalk).

The audio system 400 estimates 540 array transfer functions (ATFs) associated with the presented audio content. The ATFs, estimated by a controller (e.g., controller 430) are calculated using data captured by the one or more sensors (e.g., via eigen value decomposition). ATFs are calculated for each transducer in the transducer array 410.

The audio system 400 generates 550 sound filters for the transducer array using the estimated ATFs. The audio system 400 may generate the sound filters using a controller (e.g., the controller 430) of the audio system 400.

The audio system 400 presents 560 adjusted audio content, via the transducer array, based in part on the sound filters. The adjusted audio content has a damped region at the second ear such that the amplitude of the adjusted audio content at the first ear has a higher amplitude than at the second ear. Accordingly, the adjusted audio content may filter out crosstalk, that would otherwise occur at the second ear.

Note that the above process is described for providing content to the first ear in a manner that mitigates crosstalk with the second ear. The audio system 400 may perform a similar process, but reverse which ear is in the bright zone and which ear is in the quiet zone to provide audio content to the second ear, while mitigating crosstalk with the first ear. Sound filters for each ear may be generated in parallel and/or in series with one another, such that they are generated within a duration of the adjusted audio content. Each ear, however, receives audio content in parallel.

Example of an Artificial Reality System

Figure 6:
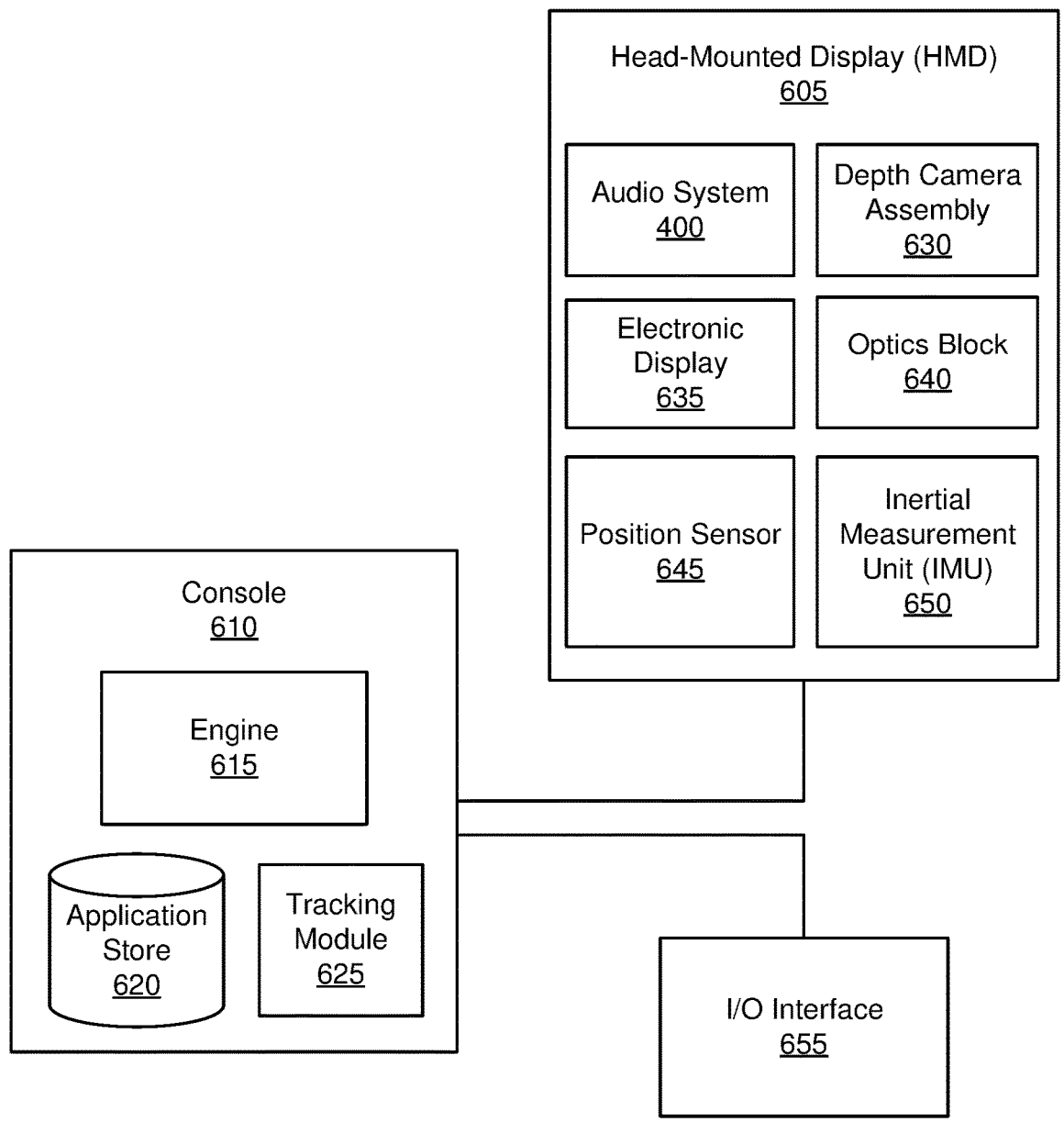
FIG. 6 is a block diagram of an example artificial reality system, in accordance with one or more embodiments.

FIG. 6 is a block diagram of an example artificial reality system 600, according to one or more embodiments. The artificial reality system 600 presents an artificial reality environment to a user, e.g., a virtual reality, an augmented reality, a mixed reality environment, or some combination thereof. The system 600 comprises a headset 605 and an input/output (I/O) interface, both of which are coupled to a console 610. The headset 605 may be an embodiment of the headset 100. While FIG. 6 shows an example system with one headset, one console, and one I/O interface, in other embodiments, any number of these components may be included in the system 600.

The headset 605 presents content to a user comprising augmented views of a physical, real-world environment with computer-generated elements (e.g., two dimensional (2D) or three dimensional (3D) images, 2D or 3D video, sound, etc.). The headset 605 may be an eyewear device or a head-mounted display. In some embodiments, the presented content includes audio content that is presented via the audio system 400 that receives audio information (e.g., an audio signal) from the headset 605, the console 610, or both, and presents audio content based on the audio information. The headset 605 presents artificial reality content to the user. The headset 605 includes the audio system 400, a depth camera assembly (DCA) 630, an electronic display 635, an optics block 640, one or more position sensors 645, and an inertial measurement unit (IMU) 650. In some embodiments, the headset 605 includes components different from those described here. Additionally, the functionality of various components may be distributed differently than what is described here.

The audio system 400 provides audio content to the user of the headset 605. As described above, with reference to FIGS. 1-5, the audio system 400 presents audio content via the transducer array 410, and captures data about the presented audio content via the sensor array 420. The audio system 400 determines sound filters that adjust audio content in a manner that mitigates crosstalk produced by tissue conduction.

The DCA 630 captures data describing depth information of a local environment surrounding some or all of the headset 605. The DCA 630 may include a light generator (e.g., structured light and/or a flash for time-of-flight), one or more imaging devices, a DCA controller, or some combination thereof. The light generator illuminates a local area with illumination light, e.g., in accordance with emission instructions generated by the DCA controller. The DCA controller is configured to control, based on the emission instructions, operation of certain components of the light generator, e.g., to adjust an intensity and a pattern of the illumination light illuminating the local area. In some embodiments, the illumination light may include a structured light pattern, e.g., dot pattern, line pattern, etc. In some embodiments, the illumination light may be used to provide additional texture for active stereo imaging via two or more imaging devices.

The one or more imaging device captures one or more images of one or more objects in the local area. In some embodiments, there are a plurality of imaging devices and depth is determined stereo. In some embodiments, the one or more objects are illuminated with the illumination light. In these instances, the DCA controller may determine the depth information using, e.g., structured light depth processing techniques, ToF depth processing techniques, active stereo depth processing techniques, stereo depth processing techniques, or some combination thereof. The DCA 630 may send the depth information to another device such as the console 610. In some embodiments, the DCA 630 may provide the captured images to the console 610, and the console 610 determines the depth information.

The electronic display 635 displays 2D or 3D images to the user in accordance with data received from the console 610. In various embodiments, the electronic display 635 comprises a single electronic display or multiple electronic displays (e.g., a display for each eye of a user). Examples of the electronic display 635 include: a liquid crystal display (LCD), an organic light emitting diode (OLED) display, an active-matrix organic light-emitting diode display (AMOLED), waveguide display, some other display, or some combination thereof.

In some embodiments, the optics block 640 magnifies image light received from the electronic display 635, corrects optical errors associated with the image light, and presents the corrected image light to a user of the headset 605. In various embodiments, the optics block 640 includes one or more optical elements. Example optical elements included in the optics block 640 include: a waveguide, an aperture, a Fresnel lens, a convex lens, a concave lens, a filter, a reflecting surface, or any other suitable optical element that affects image light. Moreover, the optics block 640 may include combinations of different optical elements. In some embodiments, one or more of the optical elements in the optics block 640 may have one or more coatings, such as partially reflective or anti-reflective coatings.

Magnification and focusing of the image light by the optics block 640 allows the electronic display 635 to be physically smaller, weigh less, and consume less power than larger displays. Additionally, magnification may increase the field of view of the content presented by the electronic display 635. For example, the field of view of the displayed content is such that the displayed content is presented using almost all (e.g., approximately 110 degrees diagonal), and in some cases, all of the user's field of view. Additionally, in some embodiments, the amount of magnification may be adjusted by adding or removing optical elements.

In some embodiments, the optics block 640 may be designed to correct one or more types of optical error. Examples of optical error include barrel or pincushion distortion, longitudinal chromatic aberrations, or transverse chromatic aberrations. Other types of optical errors may further include spherical aberrations, chromatic aberrations, or errors due to the lens field curvature, astigmatisms, or any other type of optical error. In some embodiments, content provided to the electronic display 635 for display is predistorted, and the optics block 640 corrects the distortion when it receives image light from the electronic display 635 generated based on the content.

The IMU 650 is an electronic device that generates data indicating a position of the headset 605 based on measurement signals received from one or more of the position sensors 645. A position sensor 645 generates one or more measurement signals in response to motion of the headset 605. Examples of position sensors 645 include: one or more accelerometers, one or more gyroscopes, one or more magnetometers, another suitable type of sensor that detects motion, a type of sensor used for error correction of the IMU 650, or some combination thereof. The position sensors 645 may be located external to the IMU 650, internal to the IMU 650, or some combination thereof. In one or more embodiments, the IMU 650 and/or the position sensor 645 may be sensors in the sensor array 420, configured to capture data about the audio content presented by audio content 400.

Based on the one or more measurement signals from one or more position sensors 645, the IMU 650 generates data indicating an estimated current position of the headset 605 relative to an initial position of the headset 605. For example, the position sensors 645 include multiple accelerometers to measure translational motion (forward/back, up/down, left/right) and multiple gyroscopes to measure rotational motion (e.g., pitch, yaw, and roll). In some embodiments, the IMU 650 rapidly samples the measurement signals and calculates the estimated current position of the headset 605 from the sampled data. For example, the IMU 650 integrates the measurement signals received from the accelerometers over time to estimate a velocity vector and integrates the velocity vector over time to determine an estimated current position of a reference point on the headset 605. Alternatively, the IMU 650 provides the sampled measurement signals to the console 610, which interprets the data to reduce error. The reference point is a point that may be used to describe the position of the headset 605. The reference point may generally be defined as a point in space or a position related to the eyewear device's 605 orientation and position.

The I/O interface 655 is a device that allows a user to send action requests and receive responses from the console 610. An action request is a request to perform a particular action. For example, an action request may be an instruction to start or end capture of image or video data, or an instruction to perform a particular action within an application. The I/O interface 655 may include one or more input devices. Example input devices include: a keyboard, a mouse, a hand controller, or any other suitable device for receiving action requests and communicating the action requests to the console 610. An action request received by the I/O interface 655 is communicated to the console 610, which performs an action corresponding to the action request. In some embodiments, the I/O interface 515 includes an IMU 650, as further described above, that captures calibration data indicating an estimated position of the I/O interface 655 relative to an initial position of the I/O interface 655. In some embodiments, the I/O interface 655 may provide haptic feedback to the user in accordance with instructions received from the console 610. For example, haptic feedback is provided when an action request is received, or the console 610 communicates instructions to the I/O interface 655 causing the I/O interface 655 to generate haptic feedback when the console 610 performs an action. The I/O interface 655 may monitor one or more input responses from the user for use in determining a perceived origin direction and/or perceived origin location of audio content.

The console 610 provides content to the headset 605 for processing in accordance with information received from one or more of: the headset 605 and the I/O interface 655. In the example shown in FIG. 6, the console 610 includes an application store 620, a tracking module 625 and an engine 615. Some embodiments of the console 610 have different modules or components than those described in conjunction with FIG. 6. Similarly, the functions further described below may be distributed among components of the console 610 in a different manner than described in conjunction with FIG. 6.

The application store 620 stores one or more applications for execution by the console 610. An application is a group of instructions, that when executed by a processor, generates content for presentation to the user. Content generated by an application may be in response to inputs received from the user via movement of the headset 605 or the I/O interface 655. Examples of applications include: gaming applications, conferencing applications, video playback applications, or other suitable applications.

The tracking module 625 calibrates the system environment 600 using one or more calibration parameters and may adjust one or more calibration parameters to reduce error in determination of the position of the headset 605 or of the I/O interface 655. Calibration performed by the tracking module 625 also accounts for information received from the IMU 650 in the headset 605 and/or an IMU 650 included in the I/O interface 655. Additionally, if tracking of the headset 605 is lost, the tracking module 625 may re-calibrate some or all of the system environment 600.

The tracking module 625 tracks movements of the headset 605 or of the I/O interface 655 using information from the one or more position sensors 645, the IMU 650, the DCA 630, or some combination thereof. For example, the tracking module 625 determines a position of a reference point of the headset 605 in a mapping of a local area based on information from the headset 605. The tracking module 625 may also determine positions of the reference point of the headset 605 or a reference point of the I/O interface 655 using data indicating a position of the headset 605 from the IMU 650 or using data indicating a position of the I/O interface 655 from an IMU 650 included in the I/O interface 655, respectively. Additionally, in some embodiments, the tracking module 625 may use portions of data indicating a position or the headset 605 from the IMU 650 to predict a future position of the headset 605. The tracking module 625 provides the estimated or predicted future position of the headset 605 or the I/O interface 655 to the engine 615. In some embodiments, the tracking module 625 may provide tracking information to the audio system 400 for use in generating the sound filters. The engine 615 also executes applications within the system environment 600 and receives position information, acceleration information, velocity information, predicted future positions, or some combination thereof, of the headset 605 from the tracking module 625. Based on the received information, the engine 615 determines content to provide to the headset 605 for presentation to the user. For example, if the received information indicates that the user has looked to the left, the engine 615 generates content for the headset 605 that mirrors the user's movement in a virtual environment or in an environment augmenting the local area with additional content. Additionally, the engine 615 performs an action within an application executing on the console 610 in response to an action request received from the I/O interface 655 and provides feedback to the user that the action was performed. The provided feedback may be visual or audible feedback via the headset 605 or haptic feedback via the I/O interface 655.

Additional Configuration Information

The foregoing description of the embodiments of the disclosure has been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like, in relation to manufacturing processes. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described (e.g., in relation to manufacturing processes).

Embodiments of the disclosure may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. A method comprising:
   presenting audio content via a transducer array that presents audio content via tissue conduction to an inner ear of a first ear of a user;
   monitoring, via one or more sensors on a headset, data about the presented audio content, the one or more sensors including a first group of sensors and a second group of sensors, and the first group of sensors is proximate to the first ear, and the second group of sensors is proximate to a second ear of the user and includes the at least one sensor, and at least one sensor of the one or more sensors is configured to capture data about the presented audio content at the second ear;
estimating array transfer functions (ATFs) associated with the data;
generating sound filters for the transducer array using the estimated ATFs; and
presenting adjusted audio content, via the transducer array, based in part on the sound filters, wherein the adjusted audio content has a damped region at the second ear such that the amplitude of the adjusted audio content at the first ear has a higher amplitude than at the second ear.

2. The method of claim 1, wherein the tissue conduction includes at least one of cartilage conduction and bone conduction.

3. The method of claim 1, wherein the transducer array includes a first group of transducers and a second group of transducers, and the first group of transducers is proximate to the first ear, and the second group of transducers is proximate to the second ear.

4. The method of claim 1, wherein monitoring, via the one or more sensors on the headset, data about the presented audio content, includes:
monitoring data about the presented audio content using at least one of the first group of sensors and the second group of sensors.

5. The method of claim 1, further comprising:
presenting second audio content via the transducer array that presents the second audio content via tissue conduction to an inner ear of a second ear;
monitoring, via at least one sensor on the headset, second data about the presented second audio content, the at least one sensor including at least one sensor configured to capture second data about the presented second audio content at the second ear;
estimating second array transfer functions (ATFs) associated with the second data;
generating second sound filters for the transducer array using the estimated second ATFs; and
presenting adjusted second audio content, via the transducer array, based in part on the second sound filters, wherein the adjusted audio content has a damped region at the first ear such that the amplitude of the adjusted audio content at the first ear has a higher amplitude than at the second ear.

6. The method of claim 5, wherein presenting adjusted audio content and presenting adjusted second audio content occurs over different time periods.

7. An audio system comprising:
a transducer array configured to present audio content via tissue conduction to an inner ear of a first ear of a user;
one or more sensors on a headset configured to monitor data about the presented audio content, the one or more sensors including a first group of sensors and a second group of sensors, and the first group of sensors is proximate to the first ear, and the second group of sensors is proximate to a second ear of the user and includes the at least one sensor, and at least one sensor of the one or more sensors is configured to capture data about the presented audio content at the second ear;
a controller configured to:
estimate array transfer functions (ATFs) associated with the data,
generate sound filters for the transducer array using the estimated ATFs, and
instruct the transducer array to present adjusted audio content, based in part on the sound filters, wherein the adjusted audio content has a damped region at the second ear such that the amplitude of the audio content at the first ear has a higher amplitude than at the second ear.

8. The audio system of claim 7, wherein the tissue conduction includes at least one of cartilage conduction and bone conduction.

9. The audio system of claim 8, wherein the transducer array includes a first group of transducers and a second group of transducers, and the first group of transducers is proximate to the first ear, and the second group of transducers is proximate to the second ear.

10. The audio system of claim 7, wherein the transducer array is configured to present second audio content via tissue conduction to an inner ear of a second ear of the user, and
the audio system further comprises one or more sensors on a headset configured to monitor second data about the presented audio content, the one or more sensors including at least one sensor configured to capture second data about the presented audio content at the second ear;
wherein the controller is further configured to:
estimate second array transfer functions (ATFs) associated with the second data,
generate second sound filters for the transducer array using the estimated second ATFs, and
instruct the transducer array to present adjusted second audio content, based in part on the second sound filters, wherein the adjusted audio content has a damped region at the first ear such that the amplitude of the adjusted audio content at the second ear has a higher amplitude than at the first ear.

11. The audio system of claim 10, wherein presenting adjusted audio content and presenting adjusted second audio content occurs over different time periods.

12. A non-transitory computer readable medium configured to store program code instructions, when executed by a processor, cause the processor to perform steps comprising:
presenting audio content via a transducer array that presents audio content via tissue conduction to an inner ear of a first ear of a user;
monitoring, via one or more sensors on a headset, data about the presented audio content, the one or more sensors including a first group of sensors and a second group of sensors, and the first group of sensors is proximate to the first ear, and the second group of sensors is proximate to a second ear of the user and include the at least one sensor, and at least one sensor of the one or more sensors is configured to capture data about the presented audio content at the second ear;
estimating array transfer functions (ATFs) associated with the data;
generating sound filters for the transducer array using the estimated ATFs; and
presenting adjusted audio content, via the transducer array, based in part on the sound filters, wherein the adjusted audio content has a damped region at the second ear such that the amplitude of the adjusted audio content at the first ear has a higher amplitude than at the second ear.

13. The non-transitory computer readable medium of claim 12, the steps further comprising:

presenting second audio content via the transducer array that presents the second audio content via tissue conduction to an inner ear of a second ear;
monitoring, via at least one sensor on the headset, second data about the presented second audio content, the at least one sensor including at least one sensor configured to capture second data about the presented second audio content at the second ear;
estimating second array transfer functions (ATFs) associated with the second data;
generating second sound filters for the transducer array using the estimated second ATFs; and
presenting adjusted second audio content, via the transducer array, based in part on the second sound filters, wherein the adjusted audio content has a damped region at the first ear such that the amplitude of the adjusted audio content at the first ear has a higher amplitude than at the second ear.

14. The non-transitory computer readable medium of claim 12, wherein the tissue conduction includes at least one of cartilage conduction and bone conduction.

15. A method comprising:
presenting audio content via a transducer array that presents audio content via tissue conduction to an inner ear of a first ear of a user;
monitoring, via one or more sensors on a headset, data about the presented audio content, the one or more sensors including at least one sensor configured to capture data about the presented audio content at a second ear of the user;
estimating array transfer functions (ATFs) associated with the data;
generating sound filters for the transducer array using the estimated ATFs, wherein generating the sound filters comprises:
applying an optimization algorithm to the estimated ATFs to generate the sound filters, the optimization algorithm subject to one or more constraints, and the one or more constraints include that the first ear is designated as a bright zone, and that the second ear is designated as a quiet zone; and
presenting adjusted audio content, via the transducer array, based in part on the sound filters, wherein the adjusted audio content has a damped region at the second ear such that the amplitude of the adjusted audio content at the first ear has a higher amplitude than at the second ear.

16. An audio system comprising:
a transducer array configured to present audio content via tissue conduction to an inner ear of a first ear of a user;
one or more sensors on a headset configured to monitor data about the presented audio content, the one or more sensors including at least one sensor configured to capture data about the presented audio content at a second ear;
a controller configured to:
estimate array transfer functions (ATFs) associated with the data,
apply an optimization algorithm to the estimated ATFs to generate sound filters for the transducer array, the optimization algorithm subject to one or more constraints, and the one or more constraints include that the first ear is designated as a bright zone, and that the second ear is designated as a quiet zone; and
instruct the transducer array to present adjusted audio content, based in part on the sound filters, wherein the adjusted audio content has a damped region at the second ear such that the amplitude of the audio content at the first ear has a higher amplitude than at the second ear.

17. A non-transitory computer readable medium configured to store program code instructions, when executed by a processor, cause the processor to perform steps comprising:
presenting audio content via a transducer array that presents audio content via tissue conduction to an inner ear of a first ear of a user;
monitoring, via one or more sensors on a headset, data about the presented audio content, the one or more sensors including at least one sensor configured to capture data about the presented audio content at a second ear of the user;
estimating array transfer functions (ATFs) associated with the data;
generating sound filters for the transducer array using the estimated ATFs, wherein generating the sound filters comprises:
applying an optimization algorithm to the estimated ATFs to generate the sound filters, the optimization algorithm subject to one or more constraints, and the one or more constraints include that the first ear is designated as a bright zone, and that the second ear is designated as a quiet zone; and
presenting adjusted audio content, via the transducer array, based in part on the sound filters, wherein the adjusted audio content has a damped region at the second ear such that the amplitude of the adjusted audio content at the first ear has a higher amplitude than at the second ear.

* * * * *